United States Patent
Biswas et al.

(10) Patent No.: US 9,785,760 B2
(45) Date of Patent: Oct. 10, 2017

(54) METHOD AND APPARATUS FOR MANAGING SOFTWARE ENTITLEMENTS

(71) Applicant: Adobe Systems Incorporated, San Jose, CA (US)

(72) Inventors: Sanjeev Kumar Biswas, Bangalore (IN); Daniel Carl Brotsky, Berkeley, CA (US); Pradeep Cyril Ekka, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 243 days.

(21) Appl. No.: 14/079,946

(22) Filed: Nov. 14, 2013

(65) Prior Publication Data

US 2015/0135333 A1    May 14, 2015

(51) Int. Cl.
  *G06F 7/04* (2006.01)
  *G06F 21/12* (2013.01)
  *H04L 29/06* (2006.01)

(52) U.S. Cl.
  CPC ............ *G06F 21/12* (2013.01); *H04L 63/102* (2013.01)

(58) Field of Classification Search
  CPC ... G06F 21/62; G06F 8/60; G06F 8/61; G06F 8/65; G06F 8/66; G06F 8/67; G06F 8/68; G06F 21/10; G06F 21/105; G06F 21/12; G06F 21/121; H04L 63/102
  USPC .......................................................... 726/28
  See application file for complete search history.

(56) References Cited

U.S. PATENT DOCUMENTS

| | | | |
|---|---|---|---|
| 2002/0116655 A1* | 8/2002 | Lew ..................... | H04L 12/2801 713/323 |
| 2003/0005427 A1* | 1/2003 | Herrero ..................... | G06F 8/61 717/178 |
| 2005/0131833 A1* | 6/2005 | Martinelli ............ | G06Q 20/367 705/59 |
| 2007/0288389 A1* | 12/2007 | Vaughan ................. | G06F 21/10 705/59 |
| 2009/0043596 A1* | 2/2009 | Pierce ..................... | G06Q 30/02 705/346 |
| 2010/0268552 A1* | 10/2010 | Schoenberg .......... | G06F 19/322 705/3 |
| 2012/0144457 A1* | 6/2012 | Counterman ..................... | 726/5 |
| 2014/0289184 A1* | 9/2014 | Biswas ................ | G06Q 50/184 707/607 |

\* cited by examiner

*Primary Examiner* — Kambiz Zand
*Assistant Examiner* — Abiy Getachew
(74) *Attorney, Agent, or Firm* — Keller Jolley Preece

(57) ABSTRACT

A computer implemented method and apparatus for managing software entitlements. The method comprises receiving a user request to enable access to a first software product that requires a special entitlement, wherein the user is entitled to access one or more second software products that require a corresponding one or more general entitlements, and wherein the first software product and the one or more second software products are resident in a memory accessible via a single access portal; verifying a user entitlement to the first software product requiring the special entitlement; and providing a license to enable access to the first software product that requires the special entitlement and the one or more second software products that require the general entitlement.

17 Claims, 4 Drawing Sheets

| LICENSING LEID | DOMINATED LEIDS | ~502 |
|---|---|---|
| CREATIVE CLOUD-CS6-WIN-GM | PHOTOSHOP-CS6-WIN-GM, INDESIGN-CS6-WIN-GM, ... | |
| DESIGN SUITE STANDARD-CS6-MAC-PR | PHOTOSHOP-CS6-MAC-PR, ILLUSTRATOR1-CS6-MAC-PR, ... | |
| PHOTOSHOP-CS6-WIN-GM | PHOTOSHOP-CS6-WIN-GM | |

FIG. 5A

| PID | VERSION | LEID | ~504 |
|---|---|---|---|
| 045 | 15.0 | PHOTOSHOP-CS8-WIN-GM | |
| 045 | 15.0 | PHOTOSHOP-CS8-MAC-GM | |

FIG. 5B

| LICENSING LEID | DOMINATED LEIDS | ~506 |
|---|---|---|
| CREATIVE CLOUD-CS6-WIN-GM | PHOTOSHOP-CS8-WIN-GM, PHOTOSHOP-CS8-MAC-GM, PHOTOSHOP-CS6-WIN-GM, INDESIGN-CS6-WIN-GM,.... | |
| DESIGN SUITE STANDARD-CS6-MAC-PR | PHOTOSHOP-CS6-MAC-PR, ILLUSTRATOR1-CS6-MAC-PR,... | |
| PHOTOSHOP-CS6-WIN-GM | PHOTOSHOP-CS6-WIN-GM | |

FIG. 5C

METHOD AND APPARATUS FOR MANAGING SOFTWARE ENTITLEMENTS

BACKGROUND OF THE INVENTION

Field of the Invention

Embodiments of the present invention generally relate to software entitlements and, more particularly, to a method and apparatus for managing software entitlements.

Description of the Related Art

Before a new version of software is released as one or more production versions, a pre-release version (i.e., pre-release software product) of the software is provided to a small population of subscription-based users, typically, for free. Other subscription-based users (i.e., subscribers) purchase a subscription to access the new version of software when the new version is released as the one or more production versions. Software entitlements indicate what type of subscription is provided to subscribers. Subscribers are provided a general entitlement to a software product, which enables subscriber access to the software product. Access to a pre-release version of the software product is a special entitlement. The special entitlement limits access to the pre-release version of the software to the small population of subscribers in order that the software supplier and creator have the opportunity to receive quality feedback from a limited number of subscribers concerning the pre-release version, while the current version of the product (i.e., production software product) remains accessible to all subscribers. In order to keep access to the pre-release software product separate from a production software product, the pre-release software product is stored in a separately accessible environment from the production software product. Additionally, pre-release users get a first login for the special entitlement and the same pre-release users get a second login for the general entitlement. This leads to maintaining information twice for a same set of user. Maintaining multiple environments and multiple logins creates a substantial expense to the software provider.

Therefore, there is a need for a method and apparatus for managing software entitlements.

SUMMARY OF THE INVENTION

A method for managing software entitlements is described. The method receives a user request to enable access to a first software product that requires a special entitlement, where the user is entitled to access one or more second software products having a corresponding one or more general entitlements. The first software product and the one or more second software products are resident in a common memory that is accessible via a single access portal. The method verifies a user entitlement to the first software product and provides a license to enable access to the first software product and the one or more second software products.

In another embodiment, an apparatus for managing software entitlements is described. The apparatus comprises an entitlement service module for access to a first software product that requires a special entitlement, where the user is entitled to access one or more second software products having a corresponding one or more general entitlements. The first software product and the one or more second software products are resident in a common memory that is accessible via a single access portal. The entitlement service module provides a license that enables access to the first software product and the one or more second software products.

In yet another embodiment, a computer readable medium for managing software entitlements is described. The computer readable medium stores instructions, that when performed on a processor, perform the method of receiving a user request to enable access to a first software product that requires a special entitlement, where the user is entitled to access one or more second software products having a corresponding one or more general entitlements. The first software product and the one or more second software products are resident in a common memory that is accessible via a single access portal. The method verifies a user entitlement to the first software product and provides a license to enable access to the first software product and the one or more second software products.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 5A-5C depicts an illustration 500 of merging a global dominance table with a pre-release license table to create a user dominance table, according to one or more embodiments.

Figure 1:
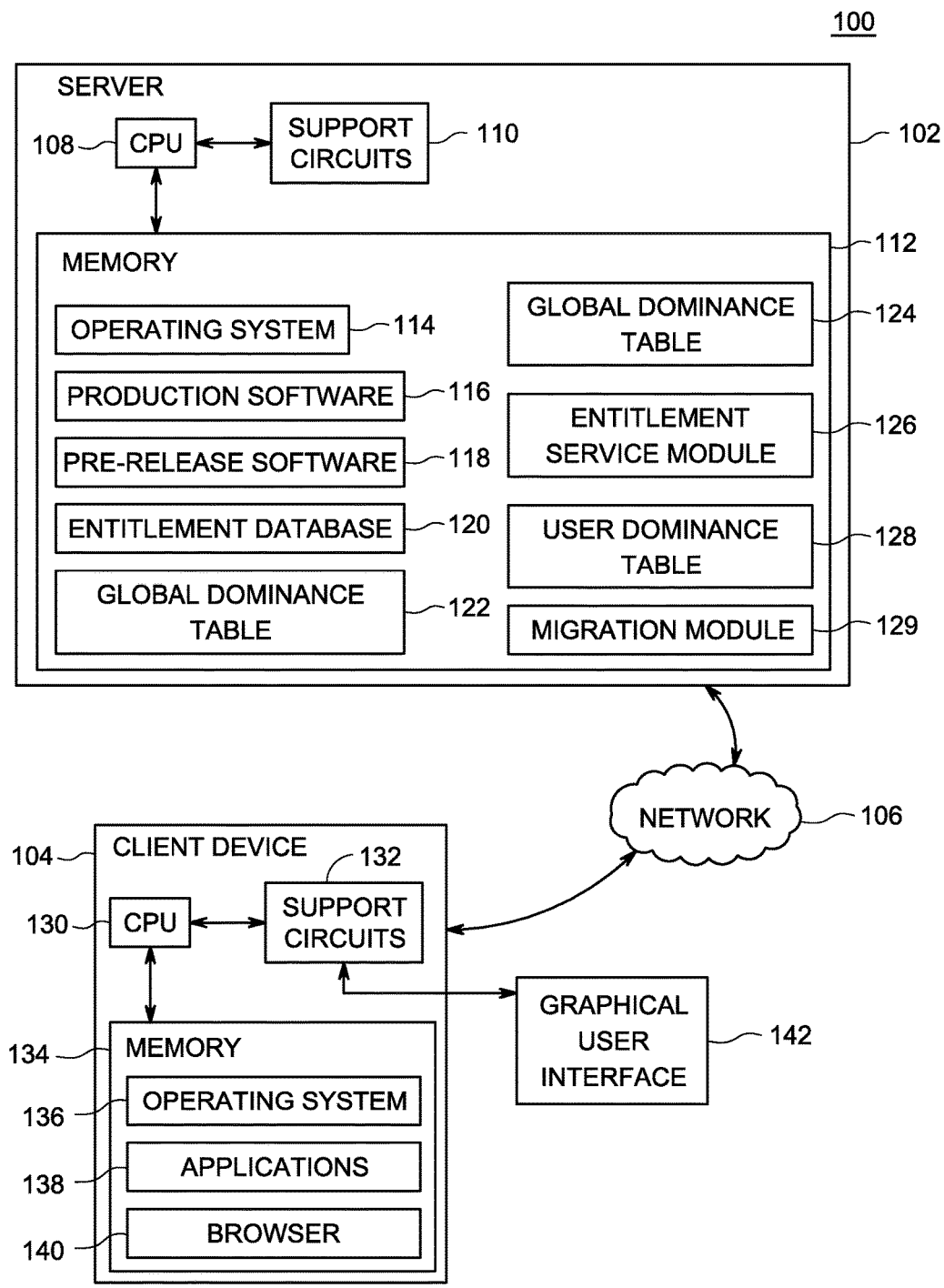
FIG. 1 is a block diagram of a system for managing software entitlements, according to one or more embodiments.

While the method and apparatus is described herein by way of example for several embodiments and illustrative drawings, those skilled in the art will recognize that the method and apparatus for managing software entitlements is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for managing software entitlements defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for managing software entitlements. The present disclosure teaches the embodiments using an exemplary embodiment of a special entitlement in conjunction with one or more general entitlements. As used herein, a special entitlement is an entitlement to enable access to a version of a software product, such as a pre-release version (i.e., a first software product). The one or more general entitlements are entitlements to enable access to one or more production versions of the same software product (i.e., second software products). However, it is appreciated that the present invention may be used to manage access to any special entitlement that provides access to a software product. The embodiments maintain a single login for a user where the login is used to manage the user's access to the user's entitlements to software products. The user may be entitled to access one or more production versions of a software product (i.e., the second software products) and in addition, the user may be entitled to access a pre-release version of the same software product (i.e., the first software product). The user, when entitled, is provided a license that enables access to both the one or more production versions of a software product and a pre-release version of the software product, where the pre-release version (i.e., first software product) and the one or more production versions (i.e., second software products) reside in a common memory that is accessible via a single access portal.

The pre-release version of the software product and one or more production versions of the software product reside in a same environment (rather than a production environment separate from a pre-release environment). A dominance table exists that reconciles the licensing of the pre-release version of the software product and the one or more production versions of the software product such that, when a user logs in, a license is provided that enables access to both the pre-release version and the one or more production versions.

In some embodiments, the memory is a common memory on a single server, meaning the pre-release version of the software product and one or more production versions of the software product reside in a same environment (rather than a production environment separate from a pre-release environment). In other embodiments, the common memory may be a distributed shared memory. With a distributed shared memory, there is not a single centralized memory, but rather a shared address space (i.e., a same physical address on two processors that refer to a same location in memory). The memory may be a shared memory space or an actual same physical memory. In any case, it is possible to access the common memory via a single access portal.

Advantageously, providers of software products, such as ADOBE Systems Incorporated, may reduce costs by maintaining a single environment, for example a single server, that houses both production software products as well as pre-release software products. In addition, a malicious user who gains access to a copy of a pre-release version of a software product is unable to execute the pre-release version because the entitlement to the pre-release software product is not stored in the malicious user's entitlements. Finally, the present invention provides a specific user with a better user experience by providing the user with a single login to access all pre-release and production software products to which the user is entitled.

Various embodiments of a method and apparatus for managing software entitlements are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for managing software entitlements, according to one or more embodiments. The system 100 includes a server 102 and a client device 104, communicatively coupled to one another via a network 106. The server 102 is a computing device, for example a desktop computer, laptop, tablet computer, and the like. The server 102 includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, one or more production software products 116, one or more pre-release software products 118, an entitlement database 120, a global dominance table 122, a pre-release license table 124, an entitlement service module 126, a user dominance table 128, and a migration module 129. The operating system 114 may include various commercially known operating systems.

The client device 104 is a computing device, for example a desktop computer, laptop, and the like. The client device 104 includes or is attached to a graphical user interface 142. The client device 104 includes a Central Processing Unit (CPU) 130, support circuits 132, and a memory 134. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like.

The memory 134 includes an operating system 136, one or more applications 138, and a browser 140. Examples of browser 140 may include, but are not limited to, FIREFOX®, GOOGLE® CHROME™, INTERNET EXPLORER®, and SAFARI®, among others. The graphical user interface 142 facilitates communication between the browser 140 and the server 102.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

In a subscription environment, where access to software products is provided by a license, a user may have subscriptions to a plurality of overlapping products. For example, a user may have a subscription to application 138, such as ADOBE® PHOTOSHOP®, INDESIGN®, and ILLUSTRATOR®. In addition, the user may have a CREATIVE CLOUD™ membership. The CREATIVE CLOUD™ membership also includes access to PHOTOSHOP®, INDESIGN®, and ILLUSTRATOR®, and in addition, access to a number of other desktop applications. A user may request access to an application 138. In order to run the application 138 to which a user is entitled, the user requires a license. If a user requests to run, for example, PHOTOSHOP® version 14.0, the entitlement service module 126 accesses the entitlement database 120 to retrieve entitlements for the user. For example, the user may visit a Universal Resource Locator (URL), such as adobe.com and provide login details or the user may click on a product icon and provide login details. The entitlement service module 126 finds that the user has two subscriptions for PHOTOSHOP® in the entitlement database 120, one for PHOTOSHOP 14.0 and one for PHOTOSHOP from the CREATIVE CLOUD membership. In order to provide the user with the license that provides maximum entitlements, the entitlement service module 126 accesses the global dominance table 122.

The global dominance table 122 includes a license for each of a plurality of software products available for subscription, in addition to a dominance value for each license. A license with a high dominance value has dominance over a license with a lower dominance value. For example, a license for single software product such as PHOTOSHOP® has a low dominance value and only dominates itself. However, a CREATIVE CLOUD™ license, which includes licenses to a plurality of software products including PHOTOSHOP®, has a high dominance value and dominates the PHOTOSHOP® license. Hence, the entitlement service module 126 determines the user's entitlements by selecting a correct license based on dominance. In the present example, the entitlement service module 126 selects the CREATIVE CLOUD™ membership license to activate PHOTOSHOP on the user's computer.

When access to a pre-release software product (i.e., the first software product) is provided to the user, for example to a pre-release version of PHOTOSHOP®, such as PHOTOSHOP 15.0, a subscription is added for the user to the entitlement database 120. However, a license for the pre-release software product (i.e., the first software product) is not added to the global dominance table 122. Rather, the license for the pre-release software product (i.e., the first software product) is stored in the pre-release license table 124.

When the user logs into the server 102 via the browser 140 and attempts to access the pre-release software product (i.e., the first software product), the entitlement service module 126 accesses the entitlement database 120 to determine the user's entitlements. The entitlement service module 126 accesses the global dominance table 122 and fails to find the license for the pre-release software product (i.e., the first software product) to which the user is entitled. The entitlement service module 126 then accesses the pre-release license table 124, extracts the license and merges the license from the pre-release license table 124 with a copy of the global dominance table 122. The resulting table that includes the license for the pre-release software product (i.e., the first software product) and the licenses from global dominance table 122 is stored in the user dominance table 128. The entitlement service module 126 then accesses the user dominance table 128 to determine the appropriate license to provide to the user. The pre-release software product license dominates all other licenses that are listed in the user dominance table 128.

Using the previous example, if a user requests access to PHOTOSHOP 15.0 (i.e., the first software product), and the user has entitlements to access to PHOTOSHOP® 14.0 (i.e., a second software product), CREATIVE CLOUD™ membership that includes PHOTOSHOP® (i.e., a second software product), and pre-release PHOTOSHOP® 15.0, entitlement service module 126 provides the user with the license for the pre-release PHOTOSHOP® 15.0. A license to PHOTOSHOP 15.0 is provided, because of its dominance. The license to PHOTOSHOP 15.0 also provides access to PHOTOSHOP 14.0 as well as access to the CREATIVE CLOUD PHOTOSHOP. With the PHOTOSHOP 15.0 license, the user may access any of the three versions of PHOTOSHOP. If, however, the user does not have an entitlement to the pre-release version of PHOTOSHOP 15.0, but has entitlements to PHOTOSHOP 14.0 and CREATIVE CLOUD PHOTOSHOP, the user is granted a license to the dominant CREATIVE CLOUD PHOTOSHOP, which provides the user with access to both the CREATIVE CLOUD PHOTOSHOP as well as PHOTOSHOP 14.0, but not the pre-release PHOTOSHOP 15.0. Although the user may have obtained a copy of the pre-release PHOTOSHOP 15.0, access is not enabled because the user does not have an entitlement.

When the pre-release version is ready to become the production version, the migration module 129 removes all pre-release versions of the software product 118 from the server 102, posts the pre-release software product 118 as the production software product 116, copies the licenses from the pre-release license table 124 to the global dominance table 122 and clears the pre-release license table 124.

Figure 2:
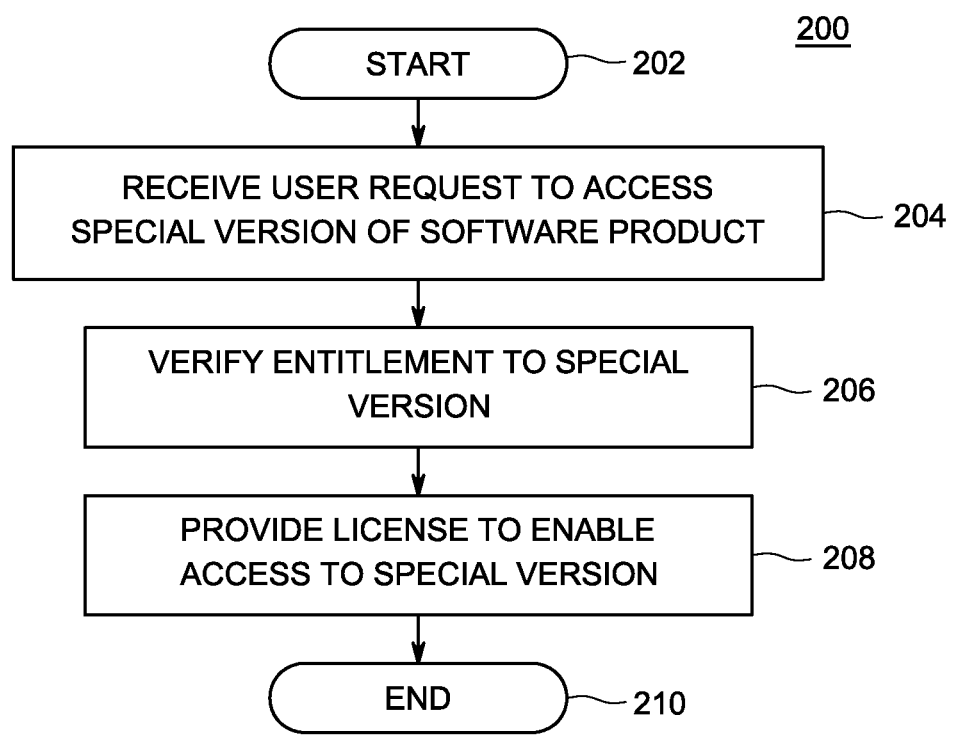
FIG. 2 depicts a flow diagram of a method for enabling access to a software product that requires a special entitlement as performed by the entitlement service module of FIG. 1, according to one or more embodiments.

FIG. 2 depicts a flow diagram of a method 200 for enabling access to a software product that requires a special entitlement as performed by the entitlement service module 126 of FIG. 1, according to one or more embodiments. The method 200 determines all versions of a software product to which a user is entitled and provides a license that enables access to the maximum number of the software product versions to which the user is entitled. The method 200 starts at step 202 and proceeds to step 204.

At step 204, the method 200 receives a user request to access a special version of a software product. The special version of the software product requires a special entitlement for access. For example, when a pre-release version of software is released, a selected population of users is provided entitlement to the pre-release version. The selected population of users may provide feedback regarding the pre-release version before the pre-release version is moved into production. A user may already have an entitlement (i.e., a subscription) to one or more production versions of a software product. For example, the user may have an entitlement to PHOTOSHOP 14.0, a CREATIVE CLOUD membership that includes PHOTOSHOP 14.0, and an entitlement to a pre-release version of PHOTOSHOP 15.0. When a user request attempts to run the pre-release version of PHOTOSHOP (i.e., version 15.0), the method 200 verifies that user's entitlements. Verification is required in the event that a malicious user received a copy of the pre-release version of PHOTOSHOP 15.0, to which he is not entitled.

The method 200 proceeds to step 206, where the method 200 verifies a user's entitlement to the special version of the software product. The method 200 accesses an entitlement database on a server of the software provider. The entitlement database includes all entitlements for a user. A user who is part of the selected population of users who is provided an entitlement to the special version of the software product has an entry that identifies the user as a "Prerelease customer", for example, that includes "DSP_PC", which identifies the user as a "Desktop Subscription Product Prerelease Customer". The entry also includes a value that identifies the special versions to which the user is entitled. The entry may look like "XXX-VV.V", where XXX represents a product identifier for the software product and VV.V is the product version. For example, a user who is entitled to the pre-release PHOTOSHOP version 15.0 may have an entry such as "045-15.0". A user who is entitled to a pre-release version of INDESIGN version 8.0 may have an entry such as "037-8.0". If a user is entitled to both the pre-release version of PHOTOSHOP version 15.0 and the pre-release version of INDESIGN version 8.0, the entry may be "045-15.0,037-8.0". The method 200 verifies that there is an entry in the entitlement database for the user for the requested special version of the software product. In the event that an entry does not exist, the request is rejected and access to the special version is denied.

The method 200 proceeds to step 208, where the method 200 provides a license to enable access to the special version of the software product, as described in further detail with respect to FIG. 3, below. The method 200 proceeds to step 210 and ends.

Figure 3:
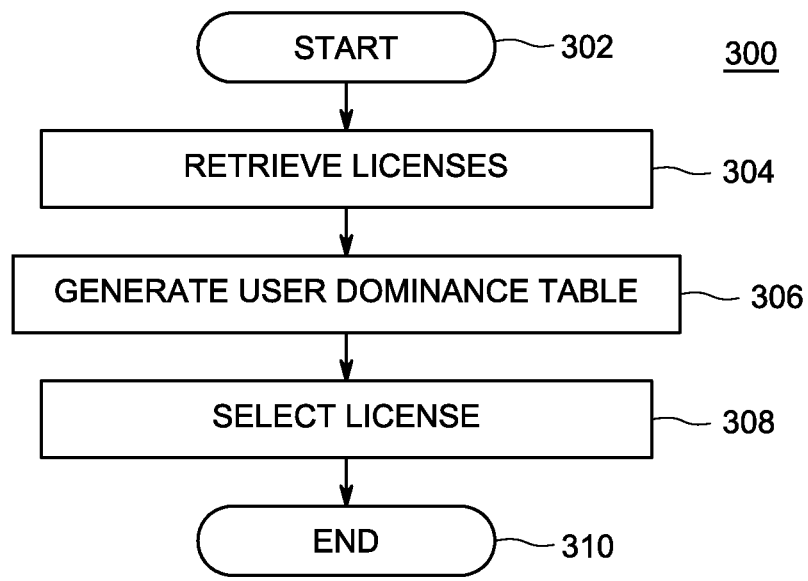
FIG. 3 depicts a flow diagram of a method for providing an appropriate license that enables access to a software product that requires a special entitlement, as performed by the entitlement service module of FIG. 1, according to one or more embodiments.

FIG. 3 depicts a flow diagram of a method 300 for providing an appropriate license that enables access to a software product that requires a special entitlement, as performed by the entitlement service module 126 of FIG. 1, according to one or more embodiments. The method 300 determines all of the versions of a software product to which a user is entitled and using a dominance table, selects a license that will enable access to all versions of the software product to which the user is entitled. The method 300 starts at step 302 and proceeds to step 304.

At step 304, the method 300 retrieves licenses for each version of a software product to which the user is entitled. For example, a user may be trying to run the pre-release version of PHOTOSHOP 15.0. However, the user may also have an entitlement to PHOTOSHOP 14.0 as well as a CREATIVE CLOUD membership that includes an entitlement to PHOTOSHOP 14.0 plus a number of other software products. The method 300 accesses the entitlement database. As described previously, an entry exists for each entitlement. From the information in each entry, the method 300 can extract the license. However, in the event that an entry is for a special entitlement, the license is stored in a special table. For example, if the special entitlement is to a pre-release version of a software product, licenses for the software product may be stored in a Pre-Release License Table as shown below:

TABLE 1

| Product ID | Version | License ID |
| --- | --- | --- |
| 045 | 15.0 | Photoshop-CS7-Win-GM |
| 045 | 15.0 | Photoshop-CS7-Mac-GM |

In the present example, the method 300 retrieves the licenses for PHOTOSHOP 14.0 and the CREATIVE CLOUD membership from the entitlement database. Due to the special marking as a Prerelease Customer, the method 300 knows to access the special table for the license to the pre-release version PHOTOSHOP 15.0.

The method 300 proceeds to step 306, where the method 300 generates a user dominance table. A global dominance table exists that includes all product version licenses and a dominance value for each license. The dominance value indicates whether one license dominates another license. For example, a license for a single product, for example, for PHOTOSHOP 14.0 only dominates itself. However, a CREATIVE CLOUD membership includes PHOTOSHOP in addition to a plurality of other software products, such as ILLUSTRATOR, INDESIGN, DREAMWEAVER, and more. As such, the license for the CREATIVE CLOUD membership dominates the license for any single product that is included with the CREATIVE CLOUD membership because the CREATIVE CLOUD license enables access to a maximum number of entitlements. The special entitlements, such as the pre-release versions of software products are not included in the global dominance table. The global dominance table exists for products that are in production, not products with special entitlements. As such, the method 300 generates a user dominance table. The method 300 merges the licenses for special entitlements of the user with the global dominance table by copying the licenses for special entitlements and the licenses from the global dominance table and storing the licenses in a single table called, for example a user dominance table. The user dominance table is specific to the user and includes the dominance values for the production versions and the pre-release versions of the software products. In the user dominance table, a pre-release version always dominates.

The method 300 proceeds to step 308, where the method 300 selects an appropriate license based on the user dominance table. The method 300 accesses the user dominance table and retrieves the license for the requested software product that has a value that is most dominant. In the present example, the license for the pre-release product version is selected. The selected license enables access to the pre-release product version of PHOTOSHOP, the CREATIVE CLOUD version of PHOTOSHOP, as well as the single product version of PHOTOSHOP.

The method 300 proceeds to step 310 and ends.

Figure 4:
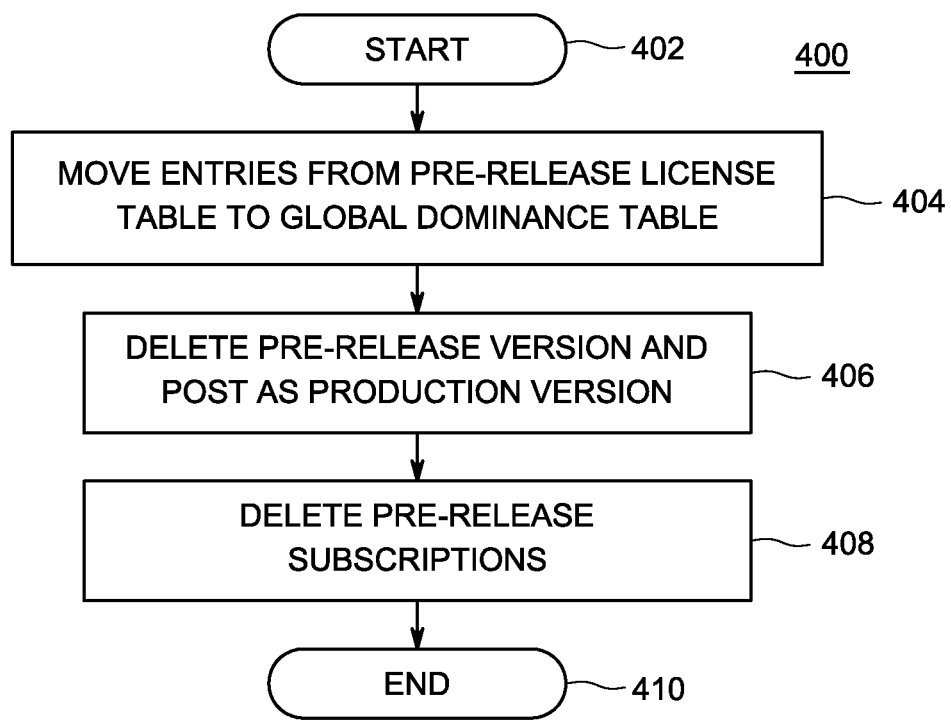
FIG. 4 depicts a flow diagram of a method for migrating the special entitlement to a general entitlement, as performed by the migration module of FIG. 1 according to one or more embodiments.

FIG. 4 depicts a flow diagram of a method 400 for migrating the special entitlement to a general entitlement, as performed by the migration module 129 of FIG. 1 according to one or more embodiments. The method 400 removes references to the special entitlement from tables and databases and posts the special entitlement as a general entitlement. As described in the exemplary embodiment, the method 400 is performed when a pre-release version of a software product becomes a production version available for use by all users. The steps of the method 400 may be performed in an order other than the order shown without taking away from the spirit of the invention. The method 400 starts at step 402 and proceeds to step 404.

At step 404, the method 400 moves the entries pertaining to the pre-release version of the software product from the special license table, for example, the pre-release license table, to the global dominance table. The method 400 looks through the pre-release license table and extracts all entries for the pre-release version and adds the entries to the global dominance table.

The method 400 proceeds to step 406, where the method 400 deletes from the software product server the pre-release version and posts the pre-release version as a production version. The method 400 proceeds to step 408, where the method 400 deletes subscriptions to the pre-release version from the entitlement database. The method 400 proceeds to step 410 and ends.

FIGS. 5A-5C depicts an illustration of merging a global dominance table 502 with a pre-release license table 504 to create a user global dominance table 506, according to one or more embodiments. FIG. 5A depicts a global dominance table 502. The global dominance table 502 includes a plurality of licensing identifiers 508. Each license identifier 508 dominates one or more dominated licenses 510. For example, a CreativeCloud-CS6-Win-GM license dominates a Photoshop-CS6-Win-GM license, an InDesign-CS6-Win-GM license, among others.

FIG. 5B depicts the pre-release license table 504 that contains the license IDs 512 for licenses associated with a pre-release version of software, Photoshop-CS8-Win-GM and Photoshop-CS8-Mac-GM.

FIG. 5C depicts a user specific global dominance table 506. The user global dominance table 506 is a result of merging the global dominance table 502 with the pre-release license table 504. The Photoshop-CS8-Win-GM and Photoshop-CS8-Mac-GM licenses 512 from the pre-release table 504 are merged with the other licenses 514 dominated by the Creative Cloud.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for managing access to pre-release and production versions of software products from a single server or single set of servers, comprising:
    maintaining a pre-release version of a software product and one or more production versions of the software product resident in a memory accessible via a single access portal, the pre-release version of the software product comprising a version of the software product not available for subscription;
    receiving a user request to access to the pre-release version of the software product, wherein the pre-release version of the software product is associated with a special entitlement for accessing the pre-release version of the software product and is available to only a subset of users of the software product, wherein the one or more production versions of the software product are associated with one or more general entitlements and are available to all subscribers of the software product;
    determining that the user request is associated with the special entitlement to the pre-release version of the software product;
    determining that a dominance value of the pre-release version of the software product is greater than a dominance value of the one or more production versions of the software product; and
    generating a license, based on the user being associated with the special entitlement and based on the dominance value of the pre-release version of the software product being greater than the dominance value of the one or more production versions of the software product, that enables a user associated with the user request to access both the pre-release version of the software product associated with the special entitlement and the one or more production versions of the software product associated with the general entitlement.

2. The method of claim 1, wherein the user request comprises a user identifier and an identification of the software product to which the user requests access.

3. The method of claim 2, wherein determining that the user request is associated with the special entitlement comprises:
    identifying, within an entitlement database, that the special entitlement has been granted to the user associated with the user request;
    retrieving, upon identification of the special entitlement, a license for the pre-release version from a pre-release license table within the memory accessible via the single access port; and
    generating, within the memory accessible via the single access portal, a user dominance table associated with the user identifier, the user dominance table comprising the license for the pre-release version of the software product and one or more licenses for the one or more production versions of the software product.

4. The method of claim 3, wherein the user dominance table further comprises the dominance value for the pre-release version of the software product and the dominance value for the one or more production versions of the software product.

5. The method of claim 4, wherein a dominance value of a version of the software product provides access to any of the pre-release version of the software product or the one or more production versions of the software product having a dominance value less than or equal to the dominance value of the version of the software product.

6. The computer implemented method as recited in claim 1, further comprising:
    associating, within an entitlement database in the memory accessible via the single access portal, the special entitlement with a subset of users of a plurality of users having a subscription to at least one of the one or more production versions of the software product; and
    wherein determining that the user request is associated is associated with the special entitlement comprises identifying that a user associated with the user request is one of the subset of users.

7. The computer implemented method as recited in claim 3, further comprising:
    converting the pre-release version of the software product to a post-release production version of the software product;
    in response to converting the pre-release version of the software product to the post-release production version of the software product:
    deleting the license for the pre-release version from the pre-release license table; and
    adding the user dominance table comprising the license for the post-release production version of the software product to a global dominance table within the memory accessible via the single access port, the global dominance table comprising a license and associated dominance value for each of the one or more production versions of the software product.

8. An apparatus for managing access to pre-release and production versions of software products from a single server or single set of servers, comprising:
    at least one processor; and
    at least one non-transitory computer-readable medium storing instructions thereon that, when executed by the at least one processor, cause the apparatus to:
        maintain a pre-release version of a software product and one or more production versions of the software product resident in a memory accessible via a single access portal, the pre-release version of the software product comprising a version of the software product not available for subscription;
        receive a user request to enable access to the pre-release version of the software product, wherein the pre-release version of the software product is associated with a special entitlement for accessing the pre-release version of the software product and is available to only a subset of users of the software product, wherein one or more production versions of the software product are associated with one or more general entitlements and are available to all subscribers of the software product;
        determine that the user request is associated with the special entitlement to the pre-release version of the software product;
        determine that a dominance value of the pre-release version of the software product is greater than a dominance value of the one or more production versions of the software product; and generate a license, based on the user being associated with the special entitlement and based on the dominance value of the pre-release version of the software product being greater than the dominance value of the one or more production versions of the software product, that enables a user associated with the user request to access both the pre-release version of the software product associated with the special entitlement and the one or more production versions of the software product associated with the general entitlement.

9. The apparatus of claim 8, wherein the user request comprises a user identifier and an identification of the software product to which the user requests access.

10. The apparatus of claim 9, wherein the instructions, when executed by the at least one processor, cause the apparatus to determine that the user request is associated with the special entitlement by performing steps comprising:
identifying, within an entitlement database, that the special entitlement has been granted to the user associated with the user request;
retrieving, upon identification of the special entitlement, a license for the pre-release version from a pre-release license table within the memory accessible via the single access port; and
generating, within the memory accessible via the single access portal, a user dominance table associated with the user identifier, the user dominance table comprising the license for the pre-release version of the software product and one or more licenses for the one or more production versions of the software product.

11. The apparatus of claim 10, wherein the user dominance table further comprises the dominance value for the pre-release version of the software product and the dominance value for the one or more production versions of the software product.

12. The apparatus of claim 8, wherein the special entitlement associated with the pre-release version of the of the software product is provided to only a selected population of the users of the software product, and wherein the one or more general entitlements associtated with the one or more production versions of the software product are provided to an entire population of the users of the software product.

13. A non-transitory computer readable medium for storing computer instructions that, when executed by at least one processor causes the at least one processor to perform steps for managing access to pre-release and production versions of software products from a single server or single set of servers, comprising:
maintaining a pre-release version of a software product and one or more production versions of the software product resident in a memory accessible via a single access portal, the pre-release version of the software product comprising a version of the software product not available for subscription;
receiving a user request to access to the pre-release version of the software product, wherein the pre-release version of the software product is associated with a special entitlement for accessing the pre-release version of the software product and is available to only a subset of users of the software product, wherein the one or more production versions of the software product are associated with one or more general entitlements and are available to all subscribers of the software product;
determining that the user request is associated with the special entitlement to the pre-release version of the software product;
determining that a dominance value of the pre-release version of the software product is greater than a dominance value of the one or more production versions of the software product; and
generating a license based on the user being associated with the special entitlement and based on the dominance value of the pre-release version of the software product being greater than the dominance value of the one or more production versions of the software product, that enables a user associated with the user request to access both the pre-release version of the software product associated with the special entitlement and the one or more production versions of the software product associated with the general entitlement.

14. The computer readable medium of claim 13, wherein the user request comprises a user identifier and an identification of the software product to which the user requests access.

15. The computer readable medium of claim 14, wherein determining that the user request is associated with the special entitlement comprises:
identifying, within an entitlement database, that the special entitlement has been granted to the user associated with the user request;
retrieving, upon identification of the special entitlement, a license for the pre-release version from a pre-release license table within the memory accessible via the single access port; and
generating, within the memory accessible via the single access portal, a user dominance table associated with the user identifier, the user dominance table comprising the license for the pre-release version of the software product and one or more licenses for the one or more production versions of the software product.

16. The computer readable medium of claim 15, wherein the user dominance table further comprises the dominance value for the pre-release version of the software product and the dominance value for the one or more production versions of the software product.

17. The computer readable medium of claim 16, wherein a dominance value of a version of the software product provides access to any of the pre-release version of the software product or the one or more production versions of the software product having a dominance value less than or equal to the dominance value of the version of the software product.

* * * * *